(12) United States Patent
Unger

(10) Patent No.: US 8,527,755 B2
(45) Date of Patent: Sep. 3, 2013

(54) METHODS AND SYSTEMS FOR EFFECTING TRANSMITTER AND RECEIVER SYNCHRONIZATION BETWEEN A TRANSMITTER AND A RECEIVER OF A TRANSMITTER/RECEIVER NETWORK

(75) Inventor: Robert A. Unger, El Cajon, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 2260 days.

(21) Appl. No.: 10/970,869

(22) Filed: Oct. 22, 2004

(65) Prior Publication Data
US 2005/0198528 A1 Sep. 8, 2005

Related U.S. Application Data

(60) Provisional application No. 60/550,976, filed on Mar. 4, 2004.

(51) Int. Cl.
*H04L 29/06* (2006.01)

(52) U.S. Cl.
USPC ........... 713/168; 713/155; 713/181; 380/229; 380/262; 705/67

(58) Field of Classification Search
USPC ................. 713/155, 168, 181; 380/262, 229; 705/67
See application file for complete search history.

(56) References Cited

U.S. PATENT DOCUMENTS

| | | | | | |
|---|---|---|---|---|---|
| 4,071,693 | A | * | 1/1978 | Frutiger | 380/262 |
| 4,467,139 | A | * | 8/1984 | Mollier | 713/181 |
| 5,365,225 | A | * | 11/1994 | Bachhuber | 340/5.26 |
| 5,369,706 | A | * | 11/1994 | Latka | 380/262 |
| 5,767,784 | A | * | 6/1998 | Khamharn | 340/5.23 |
| 6,697,490 | B1 | * | 2/2004 | Mizikovsky et al. | 380/262 |
| 7,242,766 | B1 | * | 7/2007 | Lyle | 380/2 |
| 7,243,143 | B1 | * | 7/2007 | Bullard | 709/223 |
| 2004/0059952 | A1 | * | 3/2004 | Newport et al. | 713/202 |

* cited by examiner

*Primary Examiner* — Nathan Flynn
*Assistant Examiner* — Sarah Su
(74) *Attorney, Agent, or Firm* — John L. Rogitz

(57) ABSTRACT

Methods for effecting transmitter and receiver synchronization are disclosed. A method includes reading an authentication key value that is calculated by a receiver that is to receive protected content from a transmitter, determining if there has been a change in the authentication key value calculated by the receiver since it was last read and determining if a counter associated with the transmitter has a zero value. A re-authentication of the receiver is initiated if the counter associated with the transmitter has a non zero value and the authentication key value that is calculated from the receiver has changed.

11 Claims, 6 Drawing Sheets

1

METHODS AND SYSTEMS FOR EFFECTING TRANSMITTER AND RECEIVER SYNCHRONIZATION BETWEEN A TRANSMITTER AND A RECEIVER OF A TRANSMITTER/RECEIVER NETWORK

RELATED U.S. APPLICATIONS

This Application Claims priority to provisional patent application Ser. No. 60/550,976, entitled "Fast Detection of HDCP Frame Synchronization," filed on Mar. 4, 2004, assigned to the assignee of the present application, and hereby incorporated by referenced in its entirety.

TECHNICAL FIELD

Embodiments of the present invention relate generally to transmitter/receiver networks. In particular, embodiments of the present invention relate to methods and systems for effecting transmitter and receiver synchronization in a transmitter/receiver network.

BACKGROUND ART

High-bandwidth Digital Content Protection (HDCP) is a digital content protection method that protects digital entertainment content by encrypting its transmission between video source and video receiver. Moreover, HDCP is used to authenticate devices and permit them to receive protected content. Devices are given a set of unique and secret device keys. During the authentication process, a receiver must demonstrate its knowledge of the secret device keys before content may be sent to it. After the receiver demonstrates its knowledge of the secret device keys, both the sending and receiving devices are prompted to generate a shared secret value that is designed to prevent unauthorized eavesdroppers from stealing the content. After the devices are duly authenticated, the content is encrypted and sent to the receiver whereupon it is decrypted.

FIG. 1 shows steps performed in a conventional HDCP transmission process. Referring to FIG. 1, at step 1, HDCP transmission begins with a controller initiating an authentication sequence which consists of a pseudo random number and a set of key selection values. At step 2, the receiver device receiving the HDCP transmission calculates an authentication key value and makes it available for reading as R' (the device receiving the HDCP transmission has 100 ms to execute this step). At step 3, the controller reads the R value calculated by the HDCP transmitter and the R' value calculated by the HDCP receiver, checks the R value and the R' value for a match and if a match is verified it then starts sending each frame of transmitted content with a special flag (CNTRL3) during each sync pulse. At step 4, the receiver counts 128 frames and makes the updated R' value available to the controller every time the receiver counter reaches zero. At step 5, the controller checks for a match (e.g., every 2+/− 0.5 seconds). An occasional detection of a mismatch is assumed to be an $I^2C$ read error whereupon the test (for a match) repeated. It should be appreciated that the period for 128 frames is not exactly 2 seconds.

It should be noted that if it is determined that a set of secret device keys has been compromised, the keys are placed on a revocation list and authorized devices are provided with a new set of keys. During the authentication process, the transmitter checks the revocation list before transmitting any content. Nevertheless, in certain situations it is possible for the receiver counter to get out of synchronization with the transmitter such that the authentication criteria continues to be met but attempts to decrypt protected content fail. In such situations a clear picture e.g., free of artifacts, snow, may not be derived from the transmitted signal.

In conventional systems it is possible for counters located at the transmitter and receiver ends of a communications network to be out of synchronization by one or two frames. This mismatch window may last from 17 to 33 ms or about 1% of the period between authentication tests. A more accurate test is needed since being off by even one frame means the decrypted picture may appear as snow until the devices are re-synchronized. Another conventional HDCP system shortens the test period to 16 frames but provides an inadequate solution to the above described problem as it still leaves a large window of vulnerability to frame mismatches.

SUMMARY OF THE INVENTION

Accordingly, a need exists for a method and system that minimizes vulnerability to frame mismatches between transmitter and receiver components of a transmitter/receiver network. The present invention provides methods and systems that accomplish this need.

According to one embodiment, in a transmitter/receiver network, a transmitter counter is employed to track the counter that is associated with the receiver. In one embodiment, each time the authentication key value R' is updated (and a change in the authentication key value is detected) the transmitter counter is examined to determine if it registers a zero value. A nonzero value indicates a mismatch between the transmitter counter and the receiver counter. If the transmitter counter is found to register a nonzero value then an authentication sequence may be initiated. By shadowing the receiver's counter, and determining whether a zero count has been reached after a change in the authentication key value R' has been detected, synchronization problems can be quickly detected and the transmitter and the receiver can be quickly re-synchronized.

According to one embodiment, in a transmitter/receiver network, a transmitter counter is employed to track the counter that is associated with the receiver. In one embodiment, each time the transmitter counter cycles to register a zero count value and authentication key values R' that are accessible from the transmitter and the receiver do not match, a re-authentication of the receiver is initiated. Re-authentication effects a re-synchronization of the transmitter and the receiver. By checking for authentication key value matches each time the transmitter counter cycles to zero, mismatches may be quickly detected and the transmitter and the receiver quickly re-synchronized.

A method and system for effecting transmitter and receiver synchronization is disclosed. This embodiment includes reading an authentication key value that is calculated by a receiver that is to receive protected content from a transmitter, determining if there has been a change in the authentication key value calculated by the receiver since it was last read and determining if a counter associated with the transmitter has a zero value. A re-authentication of the receiver is initiated if the counter associated with the transmitter has a non zero value.

A method and system for effecting transmitter and receiver synchronization is disclosed. This embodiment includes determining if a counter associated with a transmitter that transmits protected content to a receiver has a zero value, reading an authentication key value calculated by the transmitter and reading an authentication key value that is calculated by the receiver if the counter associated with the transmitter has a zero value and determining if the authentication key value that is calculated by the transmitter and the authentication key value that is calculated by the receiver match. A re-authentication of the receiver is initiated if the authentication key value calculated by the transmitter and the authentication key value calculated by the receiver do not match.

These and other advantages of the present invention will no doubt become obvious to those of ordinary skill in the art after having read the following detailed description of the preferred embodiments which are illustrated in the drawing figures.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION OF THE INVENTION

Figure 1:
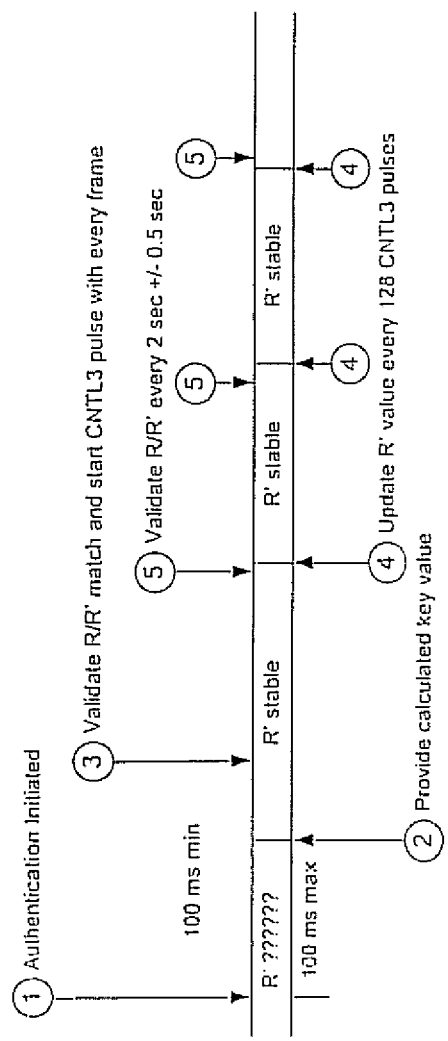
FIG. 1 shows a timeline of steps performed in a conventional HDCP transmission process.

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

Notation and Nomenclature

Some portions of the detailed descriptions which follow are presented in terms of procedures, logic blocks, processing, and other symbolic representations of operations on data bits within a computer system, server system or electronic computing device. These descriptions and representations are the means used by those skilled in the data processing arts to most effectively convey the substance of their work to others skilled in the art. A procedure, logic block, process, etc., is herein, and generally, conceived to be a self-consistent sequence of steps or instructions leading to a desired result. The steps are those requiring physical manipulations of physical quantities. Usually, though not necessarily, these physical manipulations take the form of electrical or magnetic signals capable of being stored, transferred, combined, compared, and otherwise manipulated in a computer system or similar electronic computing device. For reasons of convenience, and with reference to common usage, these signals are referred to as bits, values, elements, symbols, characters, terms, numbers, or the like with reference to the present invention.

It should be borne in mind, however, that all of these terms are to be interpreted as referencing physical manipulations and quantities and are merely convenient labels and are to be interpreted further in view of terms commonly used in the art. Unless specifically stated otherwise as apparent from the following discussions, it is understood that throughout discussions of the present invention, discussions utilizing terms such as "reading" or "determining" or "initiating" or the like, refer to the action and processes of a computer system, or similar electronic computing device, that manipulates and transforms data. For example, the data is represented as physical (electronic) quantities within the computer system's registers and memories and is transformed into other data similarly represented as physical quantities within the computer system memories or registers or other such information storage, transmission, or display devices.

Figure 2:
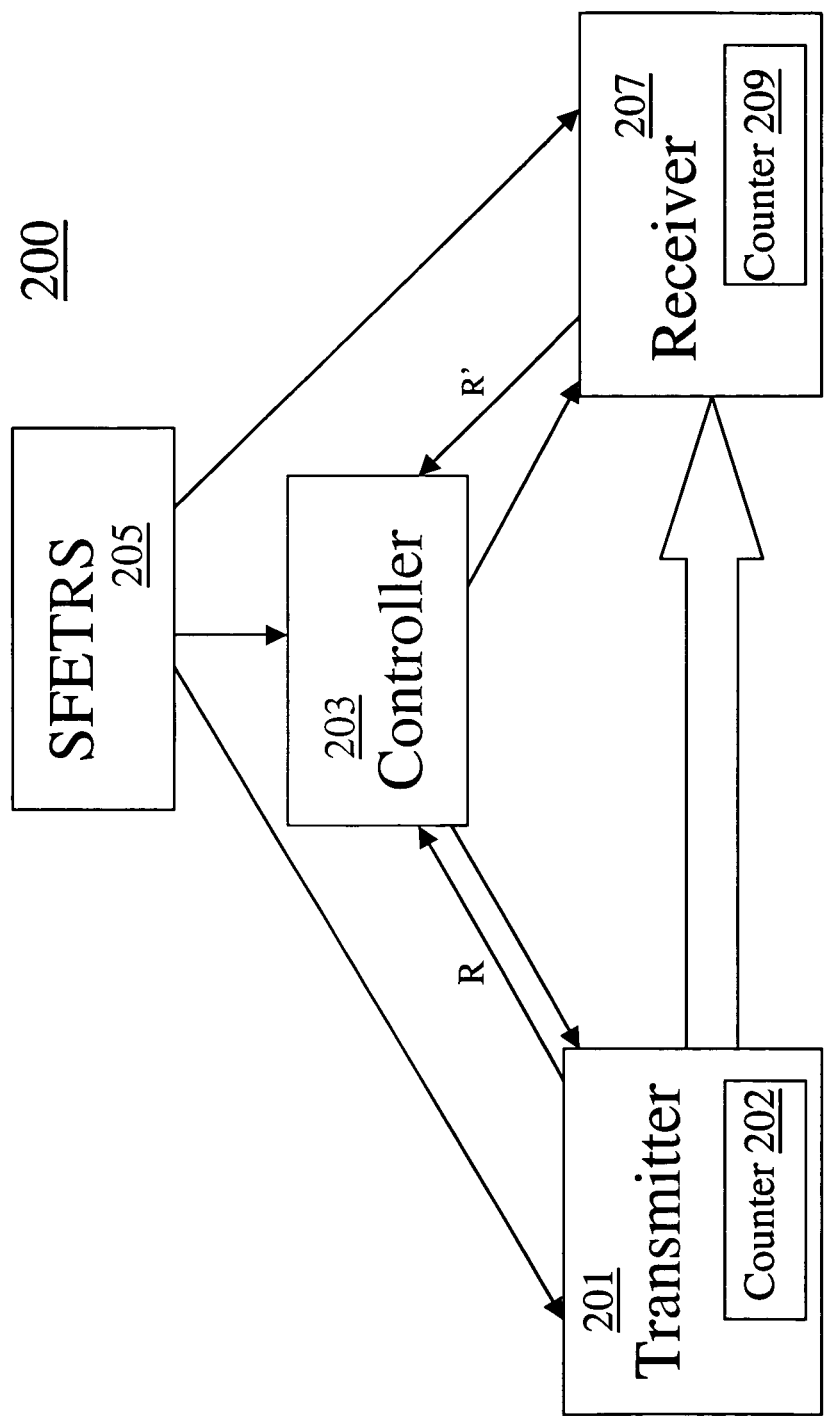
FIG. 2 shows a transmitter/receiver network that includes an exemplary system for effecting transmitter and receiver synchronization according to one embodiment of the present invention.

Exemplary Transmitter/Receiver Network in Accordance with Embodiments of the Present Invention FIG. 2 shows a transmitter/receiver network 200 that includes an exemplary system for effecting transmitter and receiver synchronization according to one embodiment of the present invention. In one embodiment, High-bandwidth Digital Content Protection (HDCP) is used to authenticate devices and permit them to receive protected content. In exemplary embodiments, transmitter 201 and receiver 207 synchronization may be effected by initiating a new authentication process when counters that are located at receiver 207 and transmitter 201 components of the transmitter/receiver network exhibit a count mismatch (indicating that the receiver 207 and the transmitter 201 are not synchronized). FIG. 2 shows transmitter 201, transmitter counter 202, controller 203, system for effecting transmitter and receiver synchronization 205, receiver 207 and receiver counter 209.

Controller 203 controls the initiation of the transmission of protected content from transmitter 201 to receiver 207. Controller 203 facilitates the HDCP transmission process by initiating the transmission of an authentication sequence to receiver 207 that is used for receiver 207 authentication purposes. The authentication sequence consists of a pseudo random number and a set of key selection values.

Transmitter 201 transmits protected content to receiver 207. According to one embodiment, the transmitter 201 may have associated with it an exemplary 128 frame counter (e.g., transmitter counter 202) that tracks a counter (e.g., receiver counter 209) that is associated with the receiver 207. By tracking the receiver counter 209 the transmitter counter 202 provides registration of a count value that can easily be compared with the count value registered by the receiver counter 209 soon after the authentication key value R' is updated. According to one embodiment, each time the authentication key value R' is updated the transmitter counter 202 is tested for a zero value. According to this embodiment, a non-zero value registered by the transmitter counter 202 indicates a counter mismatch between transmitter counter 202 and the receiver counter 209 (since according to one embodiment the authentication key value is updated when the receiver counter 209 reaches zero) which upon detection prompts the initiation of an new authentication process.

Receiver 207 receives protected content that is transmitted from transmitter 201. In exemplary embodiments, the receiver 207 is authenticated before the protected content may be transmitted to it from the transmitter 201. According to one embodiment, as was discussed above, as a part of the HDCP transmission process, receiver 207 may receive an authentication sequence (as a part of the authentication process) whose transmission to receiver 207 may be initiated by controller 203.

The reception by the receiver 207 of the authentication sequence prompts a calculation by the receiver 207 of an authentication key value R' that may be made available for reading (such as by controller 203 or system for effecting transmitter and receiver synchronization 205). According to one embodiment, the authentication key value R' that is calculated by the receiver 207 may be read to determine if it has changed since it was last read. According to one embodiment, after the authentication key value R' is calculated the transmitter counter 202 is checked for a zero value. If the transmitter counter 202 has a non zero value it indicates that a counter mismatch exists between the count values that are registered by the transmitter counter 202 and the receiver counter 209 (indicating that the transmitter 201 and the receiver 207 are not synchronized) and a new authentication process (re-authentication) may be initiated.

According to one embodiment, operations of a system for effecting transmitter and receiver synchronization 205 may encompass or be embodied in operations described above including: (1) reading the authentication key value R' calculated by the receiver, (2) checking the transmitter counter 202 for a zero value, and (3) initiating a new authentication process if a count mismatch between the transmitter counter and receiver counter is detected (see discussion made with reference to FIGS. 3 and 4 regarding components and operations that are encompassed by system for effecting transmitter and receiver synchronization). According to one embodiment, components and operations embodied by the system for effecting transmitter and receiver synchronization 205 may be encompassed by components and operations associated with the transmitter 201 and/or the receiver 207 and/or the controller 203. In another embodiment, components and operations embodied by the system for effecting transmitter and receiver synchronization 205 may be separate from, but operate in cooperation with components and operations associated with the transmitter 201 and/or the receiver 207 and/or the controller 203.

In an alternate embodiment, the transmitter counter 202 can be prompted to cycle to zero. According to this embodiment, the cycling of the transmitter counter 202 to zero causes the controller 203 to initiate a match test (a comparison of the authentication key values calculated by the transmitter 201 and the receiver 207 to determine whether or not they are synchronized) (see discussion made with reference to FIG. 4 below). The match test can be performed by means of register polling, interrupt or similar means. According to one embodiment, the count value of the receiver counter 209 may be read after incidental latency attributable to signal propagation and key calculation is accommodated to assure the validity of the reading.

It should be appreciated that conceptually authentication is controlled from the transmitter 201 (e.g., the receiver 207 is only a slave) since authentication is based on receiver 207 synchronicity with the transmitter 201. In this manner, the transmitter 201, through processes described herein, may be responsible for assuring synchronization.

Figure 3:
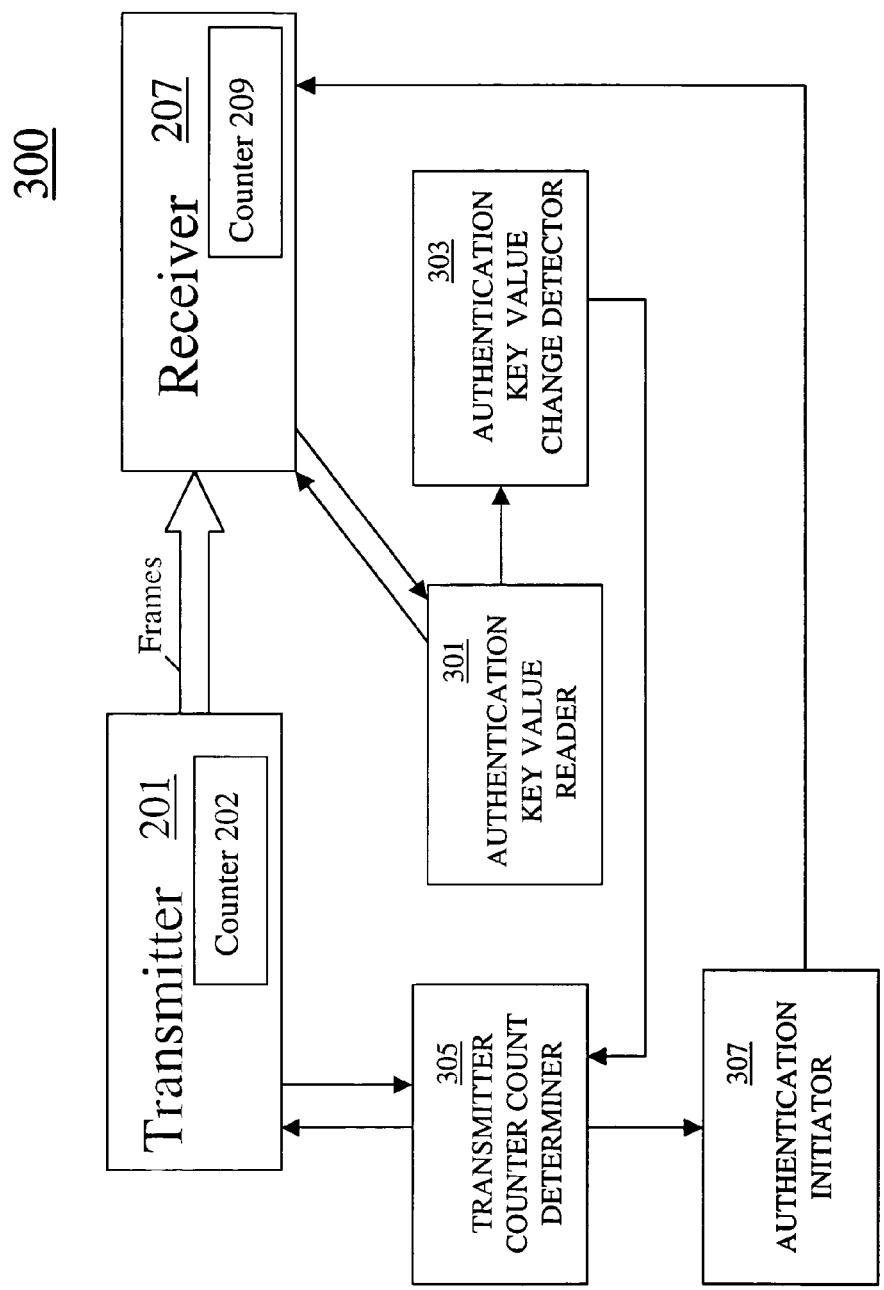
FIG. 3 shows a system for effecting transmitter and receiver synchronization between a transmitter and a receiver of a transmitter/receiver network according to one embodiment of the present invention.

Exemplary Systems for Effecting Transmitter and Receiver Synchronization Between a Transmitter and a Receiver of a Transmitter/Receiver Network in Accordance with Embodiments of the Present Invention FIG. 3 shows a system 300 (e.g., 205 in FIG. 2) for effecting transmitter and receiver synchronization between a transmitter and a receiver of a transmitter/receiver network according to one embodiment of the present invention. According to exemplary embodiments of the present invention the system for effecting transmitter and receiver synchronization 300 facilitates the synchronization of transmitter (e.g., 201 in FIG. 2) and receiver (e.g., 207 in FIG. 2) components of a transmitter/receiver network (e.g., 200 in FIG. 2) during the transmission of protected content from the transmitter (e.g., 201 in FIG. 2) to the receiver (e.g., 207 in FIG. 2). According to one embodiment, system for effecting transmitter and receiver synchronization 300 detects points during the transmission of protected content at which the transmitter (e.g., 201 in FIG. 2) and the receiver (e.g., 207 in FIG. 2) components of a transmitter/receiver network 200 are not synchronized and triggers a re-authentication of the receiver (e.g., 207 in FIG. 2) in order to synchronize these components.

It should be appreciated that the system for effecting transmitter and receiver synchronization 300 facilitates synchronization of transmitter (e.g., 201 in FIG. 2) and receiver (e.g., 207 in FIG. 2) components of a transmitter/receiver network (e.g., 200 in FIG. 2) by monitoring changes in an authentication key value R' that is calculated by a receiver (e.g., 207 in FIG. 2) and made available for reading by the receiver (e.g., 207 in FIG. 2) when the receiver counter (e.g., 209 in FIG. 2) reaches a zero count value and compelling a re-authentication of the receiver (e.g., 207 in FIG. 2) if a non zero count value is found to be registered at this point at the transmitter counter (e.g., 202 in FIG. 2) indicating that the transmitter (e.g., 201 in FIG. 2) and the receiver (e.g., 207 in FIG. 2) are not synchronized.

Because the authentication key value R' is made available when the receiver counter (e.g., 209 in FIG. 2) reaches a zero value, the detection of a non zero value at the transmitter counter (e.g., transmitter counter 202 in FIG. 2) at this point (when the receiver counter is zero) provides a positive indication that the transmitter (e.g., 201 in FIG. 2) and the receiver (e.g., 207 in FIG. 2) are not synchronized. By detecting such mismatches and triggering a re-authentication process as soon as is possible after the authentication key value R' is calculated and made available for reading, the length of the periods during which the transmitter (e.g., 201 in FIG. 2) and the receiver (e.g., 207 in FIG. 2) are not synchronized (as indicated by the mismatch of their respective counters) may be minimized. FIG. 3 shows authentication key value reader 301, authentication key value change detector 303, transmitter counter count determiner 305 and authentication initiator 307.

Authentication key value reader 301 reads an authentication key value R' that is calculated by a transmitter/receiver network receiver (e.g., 207 in FIG. 2) that is to receive protected content from a transmitter/receiver network transmitter (e.g., 201 in FIG. 2). According to one embodiment, the value that is read by the authentication key value reader 301 may be accessed by authentication key value change detector 303. According to one embodiment the authentication key value reader 301 may be embodied by components resident at the transmitter (e.g., 201 in FIG. 2), the controller (e.g., 203 in FIG. 2), or the receiver (e.g., 207 in FIG. 2) (or distributed there amongst) and may be encompassed by or operate cooperatively with components of one or more of these network devices. In another embodiment, the authentication key value reader 301 (or components thereof) may reside at a location that is remote from the transmitter (e.g., 201 in FIG. 2), the controller (e.g., 203 in FIG. 2) or the receiver (e.g., 207 in FIG. 2) and may be embodied by components that operate cooperatively with components of one or more of these network devices.

Authentication key value change detector 303 determines if there has been a change in the authentication key value R' calculated by the HDCP receiver (e.g., 207 in FIG. 2) since it was last read. The authentication key value change detector 303 tests for a change in the authentication key value R' after every 128 frames of protected content are received by the receiver (e.g., 207 in FIG. 2). The authentication key value change detector 303 may access the authentication key value R' in order to determine whether the authentication key value has changed since it was last read. According to one embodiment, the authentication key change detector 303 may be embodied by components that are resident at the transmitter (e.g., 201 in FIG. 2), the controller (e.g., 203 in FIG. 2) or the receiver (e.g., 207 in FIG. 2) (or distributed there amongst) and may be encompassed by or operate cooperatively with components of one or more of these network devices. In another embodiment, the authentication key value change detector 303 (or components thereof) may reside at a location that is remote from the transmitter (e.g., 201 in FIG. 2), the controller (e.g., 203 in FIG. 2) or the receiver (e.g., 207 in FIG. 2) and may be embodied by components that operate cooperatively with components of one or more of these network devices.

Transmitter counter count determiner 305 determines if the existing count value registered by the transmitter counter (e.g., 202 in FIG. 2) has a zero value when a change is detected in the authentication key value. According to one embodiment, the transmitter counter count determiner 305 may poll the transmitter counter in order to determine whether or not the existing count value registered by the transmitter counter is zero. If the transmitter counter count determiner 305 determines that the transmitter counter (e.g., 202 in FIG. 2) registers a non-zero value then a re-authentication is compelled by authentication initiator 307. In alternate embodiments, alternate methods of ascertaining the value registered by the transmitter counter (e.g., 202 in FIG. 2) may be employed. According to one embodiment, the transmitter count determiner 305 may be embodied by components that are resident at the transmitter (e.g., 201 in FIG. 2), the controller (e.g., 203 in FIG. 2) or the receiver (e.g., 207 in FIG. 2) (or distributed there amongst) and may be encompassed by or operate cooperatively with components of one or more of these network devices. In another embodiment, the transmitter count determiner 305 (or components thereof) may reside at a location that is remote from the transmitter (e.g., 201 in FIG. 2), the controller (e.g., 203 in FIG. 2) or the receiver (e.g., 207 in FIG. 2) and may be embodied by components that operate cooperatively with components of one or more of these network devices.

Authentication initiator 307 initiates a re-authentication process if the transmitter counter is found to register a non zero count value when the authentication key value R' that is calculated by the receiver is detected to have changed. Re-authentication effects a synchronization of the transmitter (e.g., 201 in FIG. 2) and the receiver (e.g., 207 in FIG. 2). According to one embodiment, the authentication initiator 307 may be embodied by components that are resident at the transmitter (e.g., 201 in FIG. 2), the controller (e.g., 203 in FIG. 2) or the receiver (e.g., 207 in FIG. 2) (or be distributed there amongst) and may be encompassed by or operate cooperatively with components of one or more of these network devices. In another embodiment, the authentication initiator 307 (or components thereof) may reside at a location that is remote from the transmitter (e.g., 201 in FIG. 2), the controller (e.g., 203 in FIG. 2) or the receiver (e.g., 207 in FIG. 2) and may be embodied by components that operate cooperatively with components of one or more of these network components.

In operation, as is discussed above, a transmitter counter (e.g., 202 in FIG. 2) is employed to track the counter (e.g., 209 in FIG. 2) that is associated with the receiver (e.g., 207 in FIG. 2). In one embodiment, each time the authentication key value R' is updated (and a change in the authentication key value is detected by the authentication key value change detector 303) the transmitter counter (e.g., 202 in FIG. 2) is examined to determine if it registers a zero value by transmitter counter count determiner 305. A nonzero value indicates a mismatch between the transmitter counter (e.g., 202 in FIG. 2) and the receiver counter (e.g., 209 in FIG. 2). Upon the detection of the registration of a nonzero count value of the transmitter counter (e.g., 202 in FIG. 2) an authentication sequence may be initiated by authentication initiator 307. By shadowing the HDCP receiver's counter (e.g., 209 in FIG. 2), and determining whether a zero count by the transmitter counter (e.g., 202 in FIG. 2) has been reached after a change in the authentication key value "R" has been detected, a re-authentication process may be initiated near the time that the authentication key value R' is updated and an optimized process for synchronizing the transmitter (e.g., 201 in FIG. 2) and the receiver (e.g., 207 in FIG. 2) effected.

Figure 4:
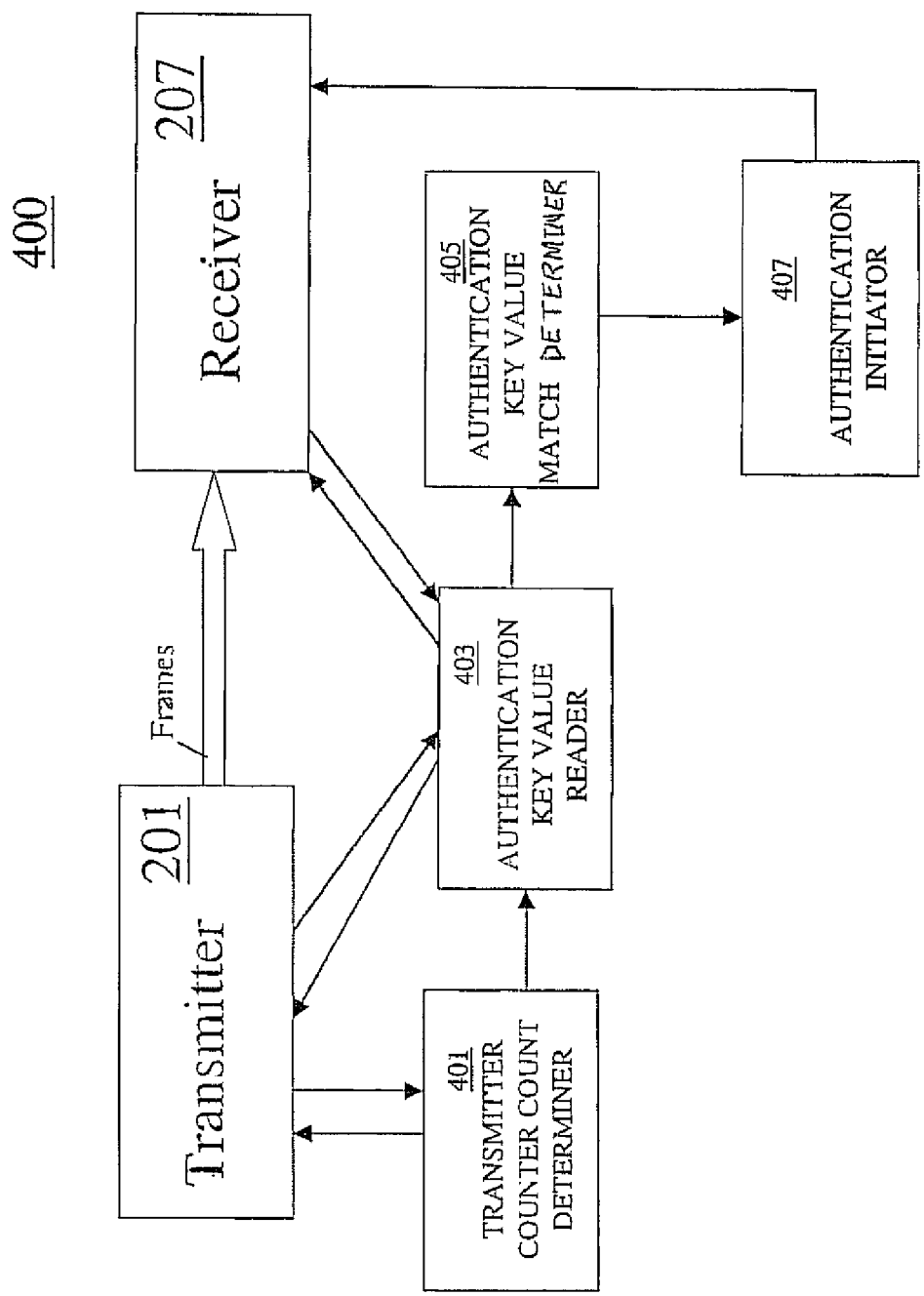
FIG. 4 shows a system for effecting transmitter and receiver synchronization between a transmitter and a receiver of a transmitter/receiver network according to another embodiment of the present invention.

FIG. 4 shows a system 400 for effecting transmitter and receiver synchronization between a transmitter and a receiver of a transmitter/receiver network according to another embodiment of the present invention. In the embodiment shown in FIG. 4, a receiver (e.g., 207 in FIG. 2) re-authentication process is initiated when a transmitter counter of the transmitter/receiver network cycles to register a zero count value (triggering the reading of the authentication key values R and R' that are accessible respectively from the transmitter and the receiver components of the transmitter/receiver network) and the authentication key values R and R' that are respectively accessible from the transmitter (e.g., 201 in FIG. 2) and the receiver (e.g., 207 in FIG. 2) components of the transmitter/receiver network do not match. The re-authentication process that is initiated effects a re-synchronization of the transmitter (e.g., 201 in FIG. 2) and the receiver (e.g., 207 in FIG. 2).

FIG. 4 shows transmitter counter count determiner 401, authentication key value reader 403, authentication key value match determiner 405, and authentication initiator 407.

Transmitter counter count determiner 401 monitors the existing count value registered by the transmitter counter (e.g., 202 in FIG. 2) for a zero value. If the transmitter counter count determiner 401 determines that the transmitter counter (e.g., 202 in FIG. 2) registers a zero count value, then the authentication key values R and R' accessible from the transmitter (e.g., 201 in FIG. 2) and the receiver (e.g., 207 in FIG. 2) at that instant respectively are read. If the authentication key values R and R' accessible from the transmitter (e.g., 201 in FIG. 2) and the receiver (e.g., 207 in FIG. 2) do not match then a re-authentication of the receiver is compelled by authentication initiator 407. According to one embodiment, the transmitter counter count determiner 401 may poll the transmitter counter in order to determine whether or not the existing count value registered by the transmitter counter (e.g., 202 in FIG. 2) is zero. In alternate embodiments, any suitable manner of determining the existing count value registered by the transmitter counter (e.g., 202 in FIG. 2) may be employed.

According to one embodiment, the transmitter count determiner 401 may be embodied by components that are resident at the transmitter (e.g., 201 in FIG. 2), the controller (e.g., 203 in FIG. 2) or the receiver (e.g., 207 in FIG. 2) (or distributed there among) and may be encompassed by or operate cooperatively with components of one or more of these network devices. In another embodiment, the transmitter count determiner 401 (or components thereof) may reside at a location that is remote from the transmitter (e.g., 201 in FIG. 2), the controller (e.g., 203 in FIG. 2) or the receiver (e.g., 207 in FIG. 2) and may be embodied by components that operate cooperatively with components of one or more of these network devices.

Authentication key value reader 403 reads the authentication key values R and R' that are calculated by the transmitter (e.g., 201 in FIG. 2) and the receiver (e.g., 207 in FIG. 2) components of a transmitter/receiver network if the transmitter counter count determiner 401 determines that the transmitter counter (e.g., 202 in FIG. 2) registers a zero count value. According to one embodiment, the values that are read by the authentication key value reader 403 may be accessed from the authentication key value reader 403 by the authentication key match determiner 405. According to one embodiment the authentication key value reader 403 may be embodied by components resident at the transmitter (e.g., 201 in FIG. 2), the controller (e.g., 203 in FIG. 2), or the receiver (e.g., 207 in FIG. 2) (or distributed there among) and may be encompassed by or operate cooperatively with components of one or more of these network devices. In another embodiment, the authentication key value reader 403 (or components thereof) may reside at a location that is remote from the transmitter (e.g., 201 in FIG. 2), the controller (e.g., 203 in FIG. 2) or the receiver (e.g., 207 in FIG. 2) and may be embodied by components that operate cooperatively with components of one or more of these network devices.

Authentication key value match determiner 405 determines if authentication key values R and R' that are calculated by the transmitter (e.g., 201 in FIG. 2) and the receiver (e.g., 207 in FIG. 2) components respectively of a transmitter/receiver network match. If the authentication key values R and R' that are calculated by the transmitter (e.g., 201 in FIG. 2) and the receiver (e.g., 207 in FIG. 2) components of the transmitter/receiver network do not match, a re-authentication of the receiver (e.g., 207 in FIG. 2) is initiated. According to one embodiment, the authentication key value match determiner 405 may be embodied by components resident at the transmitter (e.g., 201 in FIG. 2), the controller (e.g., 203 in FIG. 2) or the receiver (e.g., 207 in FIG. 2) (or distributed there amongst) and may be encompassed by or operate cooperatively with components of one or more of these network devices. In another embodiment, authentication key value match determiner 405 (or components thereof) may reside at a location that is remote from the transmitter (e.g., 201 in FIG. 2), the controller (e.g., 203 in FIG. 2) or the receiver (e.g., 207 in FIG. 2) and may be embodied by components that operate cooperatively with components of one or more of these network devices.

Authentication initiator 407 initiates a re-authentication process when the transmitter counter cycles to register a zero count value and the authentication key values R and R' that are accessible respectively from the transmitter (e.g., 201 in FIG. 2) and the receiver (e.g., 207 in FIG. 2) at this point do not match. Re-authentication effects a synchronization of the transmitter (e.g., 201 in FIG. 2) and the receiver (e.g., 207 in FIG. 2). According to one embodiment, the authentication initiator 407 may be embodied by components that are resident at the transmitter (e.g., 201 in FIG. 2), the controller (e.g., 203 in FIG. 2) or the receiver (e.g., 207 in FIG. 2) (or be distributed there amongst) and may be encompassed by or operate cooperatively with components of one or more of these network devices. In another embodiment, the authentication initiator 407 (or components thereof) may reside at a location that is remote from the transmitter (e.g., 201 in FIG. 2), the controller (e.g., 203 in FIG. 2) or the receiver (e.g., 207 in FIG. 2) and may be embodied by components that operate cooperatively with components of one or more of these network devices.

In operation, as is discussed above, a transmitter counter (e.g., 202 in FIG. 2) is employed to track the counter (e.g., 209 in FIG. 2) that is associated with the receiver (e.g., 207 in FIG. 2). In one embodiment, as discussed above, each time the transmitter counter (e.g., 202 in FIG. 2) cycles to register a zero count value and the authentication key values R and R' that are accessible from the transmitter (e.g., 201 in FIG. 2) and the receiver (e.g., 207 in FIG. 2) do not match, a re-authentication of the receiver (e.g., 207 in FIG. 2) is initiated. Re-authentication effects a re-synchronization of the transmitter (e.g., 201 in FIG. 2) and the receiver (e.g., 207 in FIG. 2). By checking for authentication key value matches each time the transmitter counter cycles to zero, mismatches may be quickly detected and the transmitter (e.g., 201 in FIG. 2) and the receiver (e.g., 207 in FIG. 2) quickly re-synchronized.

Exemplary Operations in Accordance with
Embodiments of the Present Invention

Figure 5:
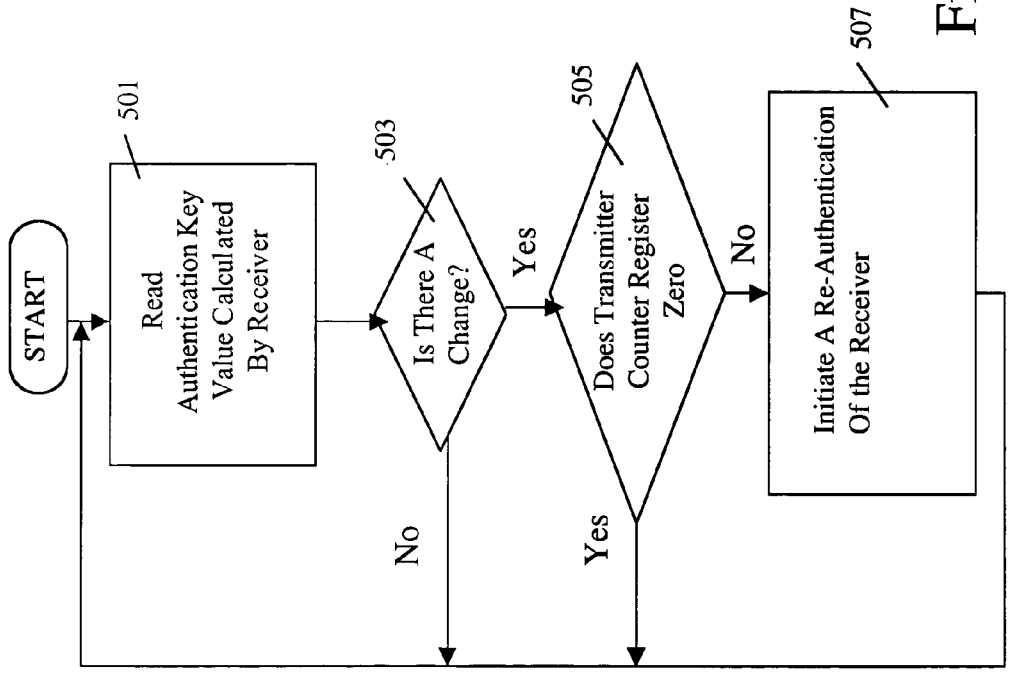
FIG. 5 is a flowchart of the steps performed in a method for effecting transmitter and receiver synchronization between a transmitter and a receiver of a transmitter/receiver network according to one embodiment of the present invention.
Figure 6:
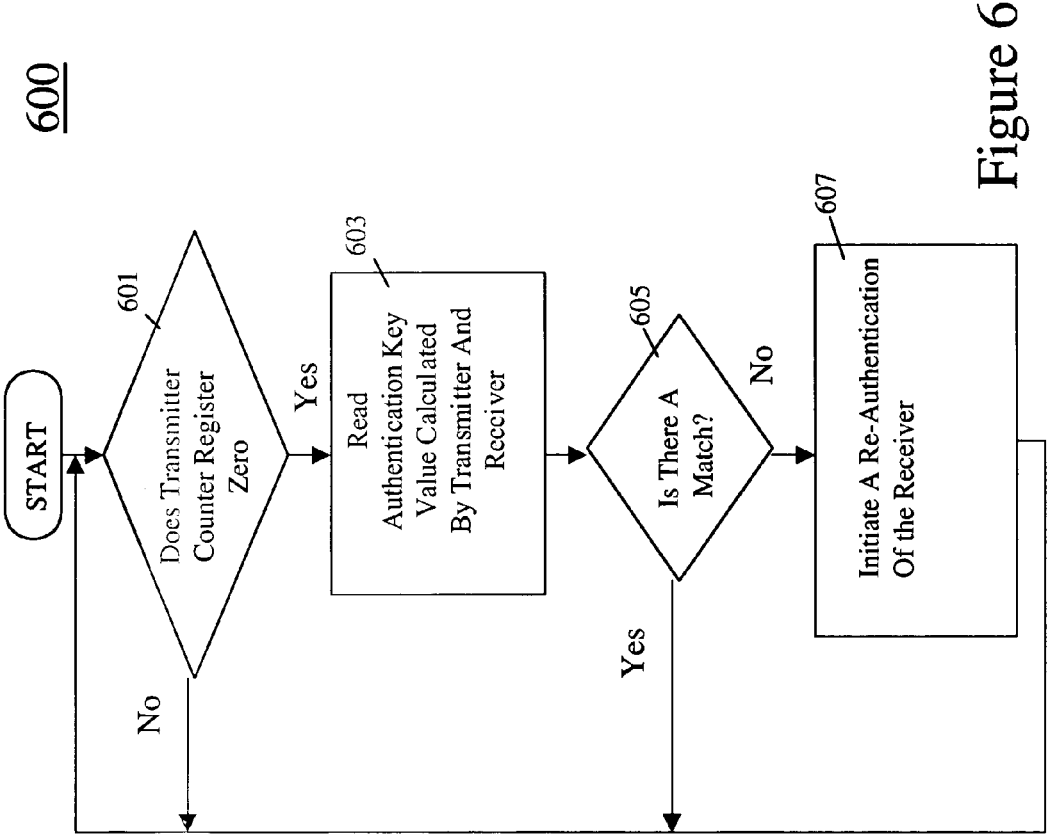
FIG. 6 is a flowchart of the steps performed in a method for effecting transmitter and receiver synchronization between a transmitter and a receiver of a transmitter/receiver network according to another embodiment of the present invention.

FIGS. 5 and 6 are flowcharts of steps performed in accordance with two embodiments of the present invention. The flowcharts illustrate processes of the present invention which, in one embodiment, are carried out by processors and electrical components under the control of computer readable and computer executable instructions. The computer readable and computer executable instructions may reside, for example, in data storage features such as computer usable volatile memory and/or computer usable non-volatile memory. However, the computer readable and computer executable instructions may reside in any type of computer readable medium. Although specific steps are disclosed in these flowcharts, such steps are exemplary. That is, the present invention is well suited to performing various other steps or variations of the steps recited in FIGS. 5 and 6. Within the present embodiment, it should be appreciated that the steps of the flowchart may be performed by software, by hardware or by any combination of software and hardware.

FIG. 5 is a flowchart 500 of the steps performed in a method for effecting transmitter and receiver synchronization between a transmitter and a receiver of a transmitter/receiver network according to one embodiment of the present invention.

At step 501, an authentication key value is read that is calculated by a receiver that is to receive protected content from a transmitter. According to one embodiment, the authentication key value is read by an authentication key value reader (e.g., 301 in FIG. 3) that reads an authentication key value R' that is calculated by a transmitter/receiver network receiver (e.g., 207 in FIG. 2) that is to receive protected content from a transmitter/receiver network transmitter (e.g., 201 in FIG. 2). According to one embodiment, the value that is read by the authentication key value reader (e.g., 301 in FIG. 3) may be accessed by authentication key value change detector (e.g., 303 in FIG. 3).

At step 503, it is determined if there has been a change in the authentication key value calculated by the receiver (e.g., 207 in FIG. 2) since it was last read. According to one embodiment, an authentication key value change detector (e.g., 303 in FIG. 3) determines if there has been a change in the authentication key value R' calculated by the receiver (e.g., 207 in FIG. 2) since it was last read. The authentication key value change detector (e.g., 303) tests for a change in the authentication key value R' after every 128 frames of protected content are received by the receiver (e.g., 207 in FIG. 2). The authentication key value change detector (e.g., 303 in FIG. 3) may access the authentication key value R' in order to determine whether the authentication key value R' has changed since it was last read.

At step 505, whether or not a counter (e.g., 202 in FIG. 2) associated with the transmitter (e.g., 201 in FIG. 2) has a zero value is determined. According to one embodiment, a transmitter counter count determiner 305 determines if the existing count value registered by the transmitter counter (e.g., 202 in FIG. 2) has a zero value when a change is detected in the authentication key value R'. According to one embodiment, the transmitter counter count determiner (e.g., 305 in FIG. 3) may poll the transmitter counter in order to determine whether or not the existing count value registered by the transmitter counter is zero. If the transmitter counter count determiner (e.g., 305 in FIG. 3) determines that the transmitter counter (e.g., 202 in FIG. 2) registers a non-zero value then a re-authentication is compelled by authentication initiator 307. In alternate embodiments, any suitable method of ascertaining the value registered by the transmitter counter (e.g., 202 in FIG. 2) may be employed.

At step 507, a re-authentication of the receiver is initiated if the counter (e.g., 202 in FIG. 2) associated with the transmitter has a non zero value. According to one embodiment, an authentication initiator (e.g., 307 in FIG. 3) initiates a re-authentication process if the transmitter counter is found to register a non zero count value when the authentication key value R' that is calculated by the receiver is detected to have changed. Re-authentication effects a synchronization of the transmitter (e.g., 201 in FIG. 2) and the receiver (e.g., 207 in FIG. 2).

FIG. 6 is a flowchart 600 of the steps performed in a method for effecting transmitter and receiver synchronization between a transmitter and a receiver of a transmitter/receiver network according to another embodiment of the present invention.

At step 601, it is determined whether a counter (e.g., 202 in FIG. 2) associated with a transmitter that transmits protected content to a receiver has a zero value. According to one embodiment, transmitter counter count determiner (e.g., 401 in FIG. 4) monitors the existing count value registered by the transmitter counter (e.g., 202 in FIG. 2) for a zero value. If the transmitter counter count determiner 401 determines that the transmitter counter (e.g., 202 in FIG. 2) registers a zero count value then the authentication key values R and R' of the transmitter (e.g., 201 in FIG. 2) and the receiver (e.g., 207 in FIG. 2) are read. If the authentication key values R and R' accessible from the transmitter (e.g., 201 in FIG. 2) and the receiver (e.g., 207 in FIG. 2) do not match, then a re-authentication of the receiver (e.g., 207 in FIG. 2) is compelled by authentication initiator (e.g., 407 in FIG. 4). According to one embodiment, the transmitter counter count determiner (e.g., 401 in FIG. 4) may poll the transmitter counter (e.g., 202 in FIG. 2) in order to determine whether or not the existing count value registered by the transmitter counter (e.g., 202 in FIG. 2) is zero. In alternate embodiments, any suitable manner of determining the existing count value registered by the transmitter counter (e.g., 202 in FIG. 2) may be employed.

At step 603, an authentication key value R calculated by the transmitter (e.g., 201 in FIG. 2) and an authentication key value R' that is calculated by the receiver (e.g., 207 in FIG. 2) is read if the counter (e.g., 202 in FIG. 2) associated with the transmitter (e.g., 201 in FIG. 2) registers a zero value. According to one embodiment, an authentication key value reader (e.g., 403 in FIG. 4) reads the authentication key values R' that are calculated by the transmitter (e.g., 201 in FIG. 2) and the receiver (e.g., 207 in FIG. 2) components of a transmitter/receiver network if the transmitter counter count determiner (e.g., 401 in FIG. 4) determines that the transmitter counter (e.g., 202 in FIG. 2) registers a zero count value. According to one embodiment, the values that are read by the authentication key value reader (e.g., 403 in FIG. 4) may be accessed from the authentication key value reader (e.g., 403 in FIG. 4) by the authentication key match determiner (e.g., 405 in FIG. 4).

At step 605, it is determined if the authentication key value R calculated by the transmitter (e.g., 201 in FIG. 2) and the authentication key value R' that is calculated by the receiver (e.g., 207 in FIG. 2) match. According to one embodiment an authentication key value match determiner (e.g., 405 in FIG. 4) determines if authentication key values R and R' that are calculated by the transmitter (e.g., 201 in FIG. 2) and the receiver (e.g., 207 in FIG. 2) match. If the authentication key values R and R' that are calculated by the transmitter (e.g., 201 in FIG. 2) and the receiver (e.g., 207 in FIG. 2) do not match, a re-authentication of the receiver (e.g., 207 in FIG. 2) is initiated.

At step 607, a re-authentication of the receiver is initiated if the authentication key value calculated by said transmitter R and the authentication key value calculated by the receiver R' do not match. According to one embodiment, an authentication initiator (e.g., 407 in FIG. 4) initiates a re-authentication process when the transmitter counter cycles to register a zero count value and the authentication key values R and R' that are accessible from the transmitter (e.g., 201 in FIG. 2) and the receiver (e.g., 207 in FIG. 2) at this point do not match. Re-authentication effects a synchronization of the transmitter (e.g., 201 in FIG. 2) and the receiver (e.g., 207 in FIG. 2).

In summary, embodiments of the present invention have been explicitly described in which systems and methods for effecting transmitter and receiver synchronization are disclosed. The method includes reading an authentication key value that is calculated by a receiver that is to receive protected content from a transmitter, determining if there has been a change in the authentication key value calculated by the receiver since it was last read and determining if a counter associated with the transmitter has a zero value. A re-authentication of the receiver is initiated if the counter associated with the transmitter has a non zero value.

The foregoing descriptions of specific embodiments of the present invention have been presented for purposes of illustration and description. They are not intended to be exhaustive or to limit the invention to the precise forms disclosed, and it is evident many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A method for effecting transmitter and receiver synchronization, said method comprising:
    reading an authentication key value that is calculated by said receiver that is to receive protected content from said transmitter;
    determining if there has been a change in said authentication key value that is calculated by said receiver since it was last read;
    determining if a counter associated with said transmitter has a zero value;
    initiating a re-authentication of said receiver if said counter associated with said transmitter has a non zero value and a change in said authentication key value was coincidentally detected, wherein said non zero value indicates a counter mismatch between said counter associated with said transmitter and a counter associated with said receiver when a change in said authentication key value is coincidentally detected.

2. The method of claim 1 wherein said reading is performed by a controller.

3. The method of claim 1 wherein said key value comprises a value calculated based on a pseudo random number and a set of key selection values.

4. The method of claim 1 wherein said determining if there has been a change in said authentication key value comprises sensing each time the authentication key value is updated.

5. The method of claim 1 wherein said counter associated with said transmitter is configured to track a counter associated with said receiver.

6. The method of claim 1 wherein said counter associated with said transmitter is a modulo 128 frame counter and wherein further said controller is an HDCP controller.

7. A system for effecting transmitter and receiver synchronization, said system comprising:
    an authentication key value reader for reading an authentication key value that is calculated by said receiver that is to receive protected content from said transmitter;
    an authentication key value change detector for determining if there has been a change in said authentication key value calculated by said receiver since it was last read;
    a count determiner for determining if a counter of said transmitter has a zero value; and
    an authentication initiator for initiating a re-authentication if said counter of said transmitter has a non zero value and said key value calculated by said receiver has coincidentally changed, wherein said non zero value indicates a counter mismatch between said counter associated with said transmitter and a counter associated with said receiver when a change in said authentication key value is coincidentally detected.

8. The system of claim 7 wherein said authentication key value reader comprises components of a controller.

9. The system of claim 7 wherein said authentication key value is calculated based on a pseudo random number and a set of key selection values.

10. The system of claim 7 wherein said counter associated with said transmitter is configured to track a counter associated with said receiver.

11. The system of claim 7 wherein said counter associated with said transmitter is a modulo 128 frame counter.

* * * * *